(12) United States Patent
Popovici

(10) Patent No.: US 8,959,103 B1
(45) Date of Patent: Feb. 17, 2015

(54) CLICK OR SKIP EVALUATION OF REORDERING RULES

(75) Inventor: Dan Popovici, Cupertino, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 13/481,166

(22) Filed: May 25, 2012

(51) Int. Cl.
*G06F 17/30* (2006.01)
(52) U.S. Cl.
USPC ............ 707/765; 707/768; 707/766; 707/722
(58) Field of Classification Search
USPC .......................... 707/718, 768, 766, 765, 722
See application file for complete search history.

(56) References Cited

U.S. PATENT DOCUMENTS

| | | | |
|---|---|---|---|
| 4,164,025 | A | 8/1979 | Dubnowski et al. |
| 4,823,306 | A | 4/1989 | Barbic et al. |
| 5,724,571 | A | 3/1998 | Woods |
| 5,826,261 | A | 10/1998 | Spencer |
| 5,926,812 | A | 7/1999 | Hilsenrath et al. |
| 5,960,383 | A | 9/1999 | Fleischer |
| 5,987,457 | A | 11/1999 | Ballard |
| 6,006,222 | A | 12/1999 | Culliss |
| 6,012,053 | A | 1/2000 | Pant et al. |
| 6,014,665 | A | 1/2000 | Culliss |
| 6,029,195 | A | 2/2000 | Herz |
| 6,035,294 | A | 3/2000 | Fish |
| 6,078,916 | A | 6/2000 | Culliss |
| 6,169,986 | B1 | 1/2001 | Bowman et al. |
| 6,182,067 | B1 | 1/2001 | Presnell et al. |
| 6,272,507 | B1 | 8/2001 | Pirolli et al. |
| 6,285,999 | B1 | 9/2001 | Page |
| 6,289,353 | B1 | 9/2001 | Hazlehurst et al. |
| 6,311,214 | B1 | 10/2001 | Rhoads |
| 6,314,419 | B1 | 11/2001 | Faisal |
| 6,360,215 | B1 | 3/2002 | Judd et al. |
| 6,405,175 | B1 | 6/2002 | Ng |
| 6,421,675 | B1 | 7/2002 | Ryan et al. |
| 6,473,752 | B1 | 10/2002 | Fleming, III |
| 6,480,837 | B1 | 11/2002 | Dutta |
| 6,513,036 | B2 | 1/2003 | Fruensgaard et al. |
| 6,636,848 | B1 | 10/2003 | Aridor et al. |

(Continued)

FOREIGN PATENT DOCUMENTS

| | | |
|---|---|---|
| EP | 1505520 | 5/2006 |
| WO | 2006/096842 | 9/2006 |

OTHER PUBLICATIONS

Huang et al., "Analyzing and Evaluating Query Reformulation Strategies in Web Search Logs," CIKM'09, Nov. 2-6, 2009, 77-86.

(Continued)

*Primary Examiner* — Jean M Corrielus
(74) *Attorney, Agent, or Firm* — Fish & Richardson P.C.

(57) ABSTRACT

Methods, systems, and apparatus, including computer programs encoded on a computer storage medium, for evaluating a query term reordering rule. In one aspect, a method includes accessing query log data that identifies, for an initial search query, two or more query terms that are included in a particular order in the initial search query, search results that were generated using the initial search query, and a particular search result selected by the user. A determination is made, using the query log data, that the particular search result includes the two or more query terms in a different order than the particular order in which the two or more query terms are ordered in the initial search query. In response to this determination, a click count is incremented for a query term reordering rule associated with the two or more query terms.

25 Claims, 6 Drawing Sheets

(56) References Cited

U.S. PATENT DOCUMENTS

| | | |
|---|---|---|
| 6,732,088 B1 | 5/2004 | Glance |
| 6,772,150 B1 | 8/2004 | Whitman et al. |
| 7,062,561 B1 | 6/2006 | Reisman |
| 7,085,820 B1 | 8/2006 | Nickerson et al. |
| 7,409,383 B1 | 8/2008 | Tong et al. |
| 7,480,652 B2 | 1/2009 | Wen et al. |
| 7,562,069 B1 | 7/2009 | Chowdhury et al. |
| 7,617,200 B2 | 11/2009 | Budzik et al. |
| 7,620,628 B2* | 11/2009 | Kapur et al. .................. 1/1 |
| 7,636,714 B1 | 12/2009 | Lamping et al. |
| 7,716,216 B1 | 5/2010 | Harik et al. |
| 7,788,261 B2* | 8/2010 | Hoeber et al. ............... 707/728 |
| 7,860,870 B2 | 12/2010 | Sadagopan et al. |
| 7,925,498 B1 | 4/2011 | Baker et al. |
| 7,966,341 B2* | 6/2011 | Maghoul et al. ............ 707/768 |
| 8,001,118 B2 | 8/2011 | Dean et al. |
| 8,037,086 B1 | 10/2011 | Upstill et al. |
| 8,041,730 B1 | 10/2011 | Upstill et al. |
| 8,065,316 B1 | 11/2011 | Baker et al. |
| 8,103,669 B2 | 1/2012 | Castellani et al. |
| 8,250,066 B2 | 8/2012 | Miedema |
| 8,316,007 B2 | 11/2012 | Liao |
| 8,321,201 B1 | 11/2012 | Baker et al. |
| 8,346,757 B1 | 1/2013 | Lamping et al. |
| 8,392,443 B1* | 3/2013 | Allon et al. .................. 707/765 |
| 8,429,184 B2 | 4/2013 | Ismalon |
| 8,463,782 B1 | 6/2013 | Upstill et al. |
| 8,498,974 B1 | 7/2013 | Kim et al. |
| 8,600,973 B1 | 12/2013 | Popovici et al. |
| 8,620,915 B1 | 12/2013 | Brukman et al. |
| 8,645,390 B1 | 2/2014 | Oztekin et al. |
| 8,762,363 B1 | 6/2014 | Koo et al. |
| 2002/0032735 A1 | 3/2002 | Burnstein et al. |
| 2002/0078045 A1 | 6/2002 | Dutta |
| 2002/0103798 A1 | 8/2002 | Abrol et al. |
| 2002/0133483 A1 | 9/2002 | Klenk et al. |
| 2002/0156816 A1 | 10/2002 | Kantrowitz et al. |
| 2003/0123443 A1 | 7/2003 | Anwar |
| 2003/0167266 A1 | 9/2003 | Saldanha et al. |
| 2005/0076003 A1 | 4/2005 | DuBose et al. |
| 2005/0125392 A1 | 6/2005 | Curtis et al. |
| 2006/0167842 A1* | 7/2006 | Watson ....................... 707/3 |
| 2007/0011154 A1 | 1/2007 | Musgrove et al. |
| 2007/0214131 A1* | 9/2007 | Cucerzan et al. ............ 707/5 |
| 2008/0091670 A1 | 4/2008 | Ismalon |
| 2008/0097891 A1 | 4/2008 | Park |
| 2008/0114721 A1 | 5/2008 | Jones et al. |
| 2008/0114751 A1 | 5/2008 | Cramer et al. |
| 2008/0140643 A1 | 6/2008 | Ismalon |
| 2008/0147638 A1* | 6/2008 | Hoeber et al. ............... 707/5 |
| 2008/0228754 A1 | 9/2008 | Frank et al. |
| 2008/0235187 A1 | 9/2008 | Gade et al. |
| 2008/0270138 A1 | 10/2008 | Knight et al. |
| 2009/0006359 A1 | 1/2009 | Liao |
| 2009/0043749 A1* | 2/2009 | Garg et al. ................... 707/5 |
| 2009/0063431 A1 | 3/2009 | Erol et al. |
| 2009/0106221 A1 | 4/2009 | Meyerzon et al. |
| 2009/0119261 A1 | 5/2009 | Ismalon |
| 2009/0182734 A1 | 7/2009 | Wen et al. |
| 2010/0010968 A1 | 1/2010 | Redlich et al. |
| 2010/0125575 A1* | 5/2010 | Zaragoza ..................... 707/731 |
| 2010/0138402 A1 | 6/2010 | Burroughs et al. |
| 2010/0257164 A1 | 10/2010 | Halverson et al. |
| 2010/0306229 A1 | 12/2010 | Timm et al. |
| 2011/0179023 A1 | 7/2011 | Dean et al. |
| 2012/0095951 A1 | 4/2012 | Ray |
| 2012/0158685 A1 | 6/2012 | White et al. |
| 2012/0158765 A1 | 6/2012 | Kumar et al. |
| 2012/0290637 A1 | 11/2012 | Perantatos et al. |
| 2012/0303651 A1 | 11/2012 | Tao |
| 2012/0317088 A1 | 12/2012 | Pantel et al. |
| 2012/0323677 A1 | 12/2012 | Bottou et al. |
| 2013/0246383 A1* | 9/2013 | White et al. ................. 707/706 |

OTHER PUBLICATIONS

"The Direct Hit Popularity Engine Technology, A White Paper," [online]; Retrieved from the Internet URL: http://www.uni-koblenz.de/FB4/Institues/ICV/AGKrause/Teachings/SS07/DirectHit.pdf, Apr. 2, 2009, 5 pages.

Ananthanarayanan et al., "Rule based synonyms for entity extraction from noisy text", In Proceedings of the second workshop on Analytics for noisy unstructured text data, pp. 31-38, ACM, Jul. 2008.

Efthimiadis, "Interactive Query Expansion: A User-Based Evaluation in a Relevance Feedback Environment," Journal of the American Society for Information Science, 51(11):989-1003, 2000, John Wiley & Sons, Inc.

Office Action issued in U.S. Appl. No. 13/661,734 on Apr. 14, 2014, 6 pages.

Notice of Allowance issued in U.S. Appl. No. 13/532,326 on Feb. 25, 2014, 5 pages.

Office Action issued in U.S. Appl. No. 13/532,326 on Oct. 24, 2013, 13 pages.

Office Action issued in U.S. Appl. No. 13/651,688 on Apr. 7, 2014, 32 pages.

Office Action issued in U.S. Appl. No. 13/651,688 on Jan. 17, 2014, 30 pages.

Office Action issued in U.S. Appl. No. 13/727,968 on Aug. 19, 2014, 12 pages.

Office Action issued in U.S. Appl. No. 13/443,405 on Jun. 19, 2014, 10 pages.

Office Action issued in U.S. Appl. No. 13/302,935 on Jul. 11, 2014, 16 pages.

Notice of Allowance received in U.S. Appl. No. 13/342,560 on Jul. 24, 2013, 22 pages.

Office Action issued in U.S. Appl. No. 13/342,560 on Apr. 18, 2013, 14 pages.

Office Action issued in U.S. Appl. No. 13/342,560 on Nov. 26, 2012, 15 pages.

Office Action issued in U.S. Appl. No. 13/342,604 on Dec. 20, 2012, 13 pages.

Office Action issued in U.S. Appl. No. 13/342,604 on May 13, 2013, 12 pages.

Office Action issued in U.S. Appl. No. 13/564,882 on Jul. 1, 2014, 8 pages.

\* cited by examiner

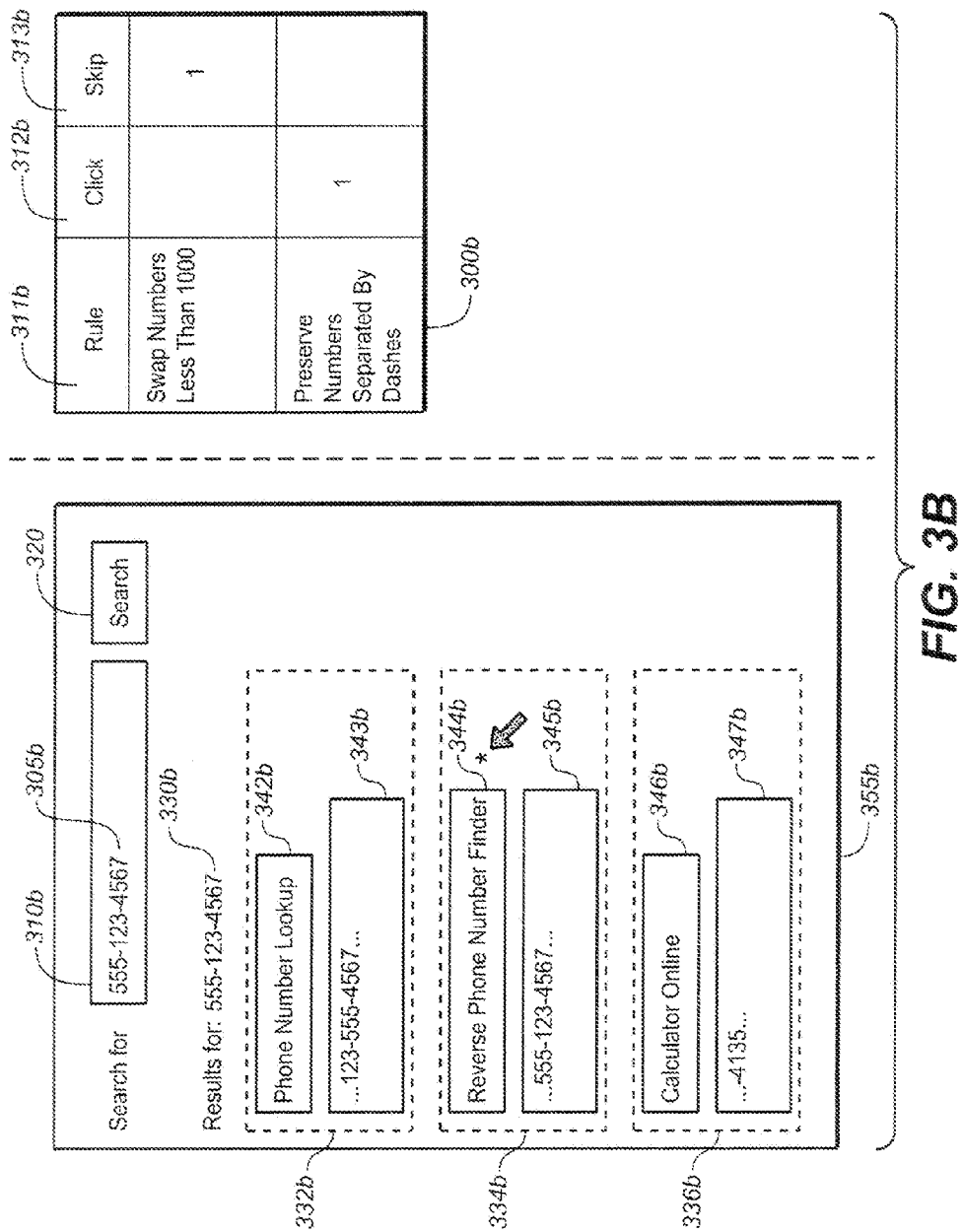

CLICK OR SKIP EVALUATION OF REORDERING RULES

BACKGROUND

This specification generally relates to search engines, and one particular implementation relates to evaluating reordering rules that are used in revising search queries or in scoring resources that are identified in response to search queries.

SUMMARY

In general, one innovative aspect of the subject matter described in this specification may be embodied in methods that include the actions of evaluating a query term reordering rule based on determining whether a user has (i) selected a search result that includes two or more query terms in an order that is different than the order in which the two or more query terms occur in the corresponding search query (referred to as a "click evaluation" of a query term reordering rule), or (ii) selected a search result that ranks below a search result that includes two or more query terms in the order that is different than the order in which the two or more query terms occur in the corresponding search query (referred to as a "skip evaluation" of a query term reordering rule).

In either instance, the reordering engine may infer, through a user's clicking on or skipping a particular search result, that the occurrence of the reordered query terms in the particular search result played some part in the user's decision to select or not select the particular search result. This insight may be used to measure the quality of the reordering rule, for example to allow the search systems to determine whether other search queries should be revised to reorder query terms, or whether occurrences of the query terms, in the different order, should be scored as highly as occurrences of the query terms, in the original order, in resources that are identified in response to other search queries.

In general, another innovative aspect of the subject matter described in this specification may be embodied in methods that include the actions of accessing query log data that identifies, for an initial search query, two or more query terms that are included in a particular order in the initial search query, search results that were generated using the initial search query, and a particular search result selected by the user. A determination is made, using the query log data, that the particular search result includes the two or more query terms in a different order than the particular order in which the two or more query terms are ordered in the initial search query. In response to determining that the particular search result includes the two or more query terms in the different order, a click count is incremented for a query term reordering rule associated with the two or more query terms.

Other embodiments of this aspect include corresponding systems, apparatus, and computer programs recorded on computer storage devices, each configured to perform the operations of the methods.

In general, another innovative aspect of the subject matter described in this specification may be embodied in methods that include the actions of accessing query log data that identifies, for an initial search query, two or more query terms that are included in a particular order in the initial search query, search results that were generated using the initial search query, a ranking of the search results, and a particular search result selected by the user. A determination is made, using the query log data, that a search result that is ranked above the particular search result includes the two or more query terms in a different order than the particular order in which the two or more query terms are ordered in the initial search query. In response to determining that the search result that is ranked above the particular search result includes the two or more query terms in the different order, a skip count is incremented for a query term reordering rule associated with the two or more query terms.

Other embodiments of this aspect include corresponding systems, apparatus, and computer programs recorded on computer storage devices, each configured to perform the operations of the methods.

These and other embodiments can each optionally include one or more of the following features. The actions include assigning a score to the query term reordering rule based on the click count and a skip count. The score is based on a ratio of (i) the click count to (ii) the click count and the skip count. The actions include determining that the score for the query term reordering rule does not meet a threshold, and removing the query term reordering rule from a set of query term reordering rules used to generate revised search queries based on determining that the score does not meet the threshold. A first weight is associated with the click count and a second weight is associated with the skip count. The score satisfies:

$$\frac{W1(\text{click count})}{W1(\text{click count}) + W2(\text{skip count})} \quad (1)$$

W1 represents the first weight associated with the click count and W2 represents the second weight associated with the skip count. The query term reordering rule comprises a query term revision rule for revising search queries by reordering the two or more query terms from the particular order to the different order. The query term reordering rule comprises a query term scoring rule for scoring occurrences of the two or more query terms that occur in the different order in resources that are identified in response to search queries. The different order is a reverse of the particular order.

Other embodiments of these aspects include corresponding systems, apparatus, and computer programs, configured to perform the actions of the methods, encoded on computer storage devices.

Particular embodiments of the subject matter described in this specification can be implemented so as to realize one or more of the following advantages. Click and skip evaluation of reordering rules can identify reordering rules that should be removed from a search system. Click and skip evaluation can also improve the quality of retrieved search results by helping to eliminate search results that users found unhelpful. Click and skip evaluation of reordering rules can also demote (instead of removing completely) reordering rules, allowing low-confidence rules to be used less frequently in retrieving search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B illustrate example search results pages and tables that show the example result of evaluating query term reordering rules using click and skip evaluation.

Like reference numbers and designations in the various drawings indicate like elements.

DETAILED DESCRIPTION

Figure 1:
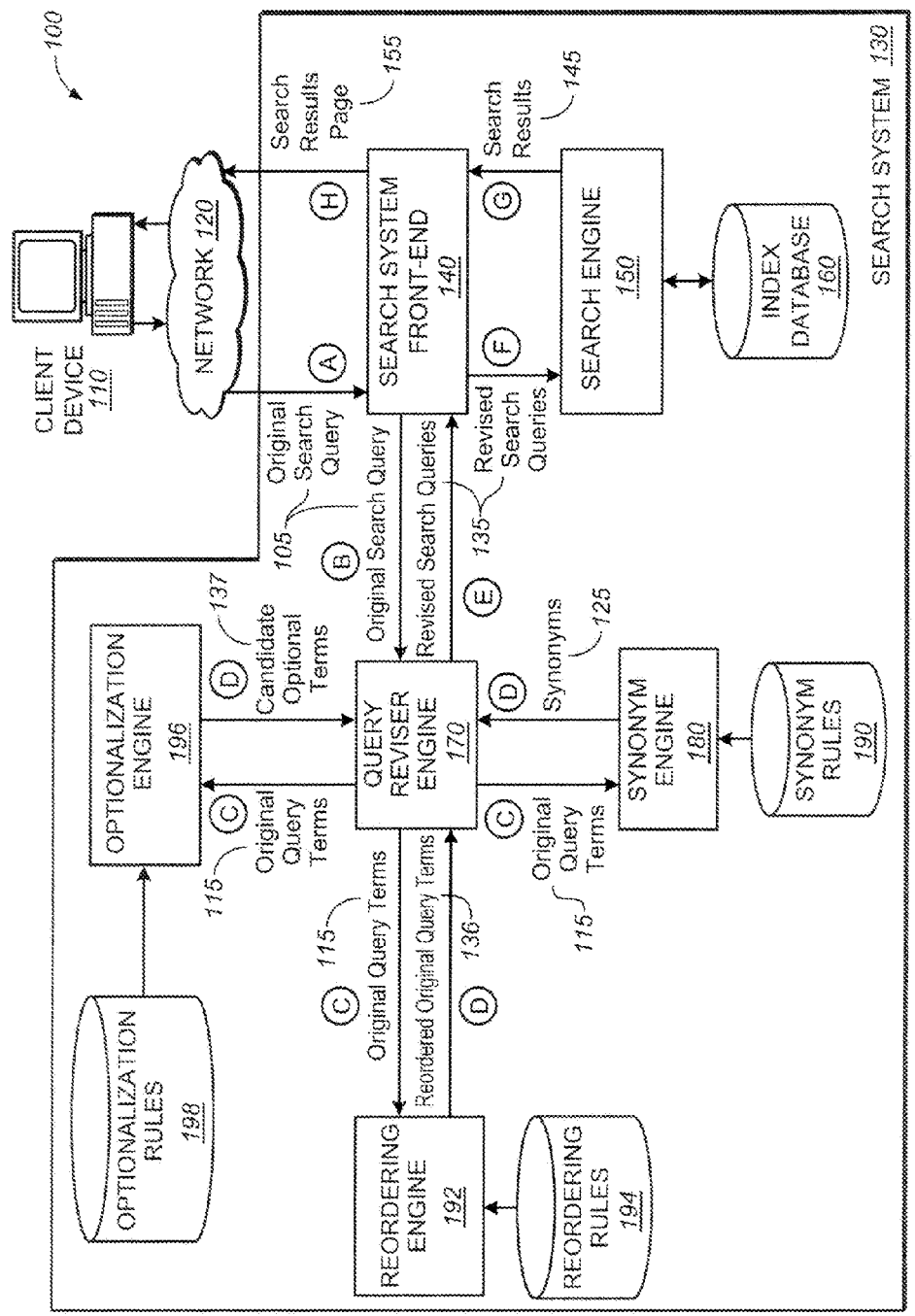
FIG. 1 is a diagram of an example system that revises search queries to include synonyms of query terms, to reorder query terms, and to optionalize query terms.

FIG. 1 is a diagram of an example system 100 that revises search queries, for instance to reorder query terms, to optionalize query terms, and to include synonyms of query terms. In general, the system 100 includes a client device 110 coupled to a search system 130 over a network 120. The search system 130 receives an original search query 105 from the client device 110 over network 120, and the search system 130 provides a search results page 155 that presents search results 145 identified as being responsive to the query 105 to the client device 110 over the network 120.

The search results 145 identified by the search system 130 can include one or more search results that were identified as being responsive to queries that are different than the original search query 105. The other queries can be obtained or generated in numerous ways, including by revising the original search query 105.

In one example, the search system 130 can optionally generate a revised search query 135 by reordering the terms of the original search query 105. In other implementations, the search system 130 can optionally generate a revised search query 135 by designating terms of the original search query 105 as optional. As used by this specification, "reorderings" are terms of the original search query 105 that have been reordered according to a reordering rule, and "optionalizations" are terms of the original search query 105 that have been designated as optional. The original search query 105 and the revised queries 135 can be used by a search engine 150 to identify and rank search results. The identified search results 145 can be provided to the client device 110 on a search results page 155.

The search system 130 can optionally generate reordered original query terms 136 from the original search query 105 by reordering some or all of the original query terms 115 according to various query term reordering rules. The search system 130 may or may not add or remove query terms from the original search query 105 when creating the reordered original query terms 136. For instance, given the original query terms 115 "pants 34 30", the search system can generate reordered original query terms "34 30 pants" and "pants 30 34", and can use some or all of the reordered original query terms 136 when revising the original search query 105.

The search system 130 can identify candidate optional terms 137 from the original search query 105, by applying optionalization rules 198 to the original search query 105. For instance, given the original query "atlanta extreme bungee jump", the search system can identify some or all of the terms as candidate optional terms 137, and can designate some or all of the candidate optional terms 137 as optional when revising the original search query 105.

The search system 130 can be implemented as, for example, computer programs running on one or more computers in one or more locations that are coupled to each other through a network. The search system 130 includes a search system front end 140 (or a "gateway server") to coordinate requests between other parts of the search system 130 and the client device 110. The search system 130 also includes a search engine 150, a query reviser engine 170, a synonym engine 180, a reordering engine 192, and an optionalization engine 196.

As used by this specification, an "engine" (or "software engine") refers to a software implemented input/output system that provides an output that is different than the input. An engine may be an encoded block of functionality, such as a library, a platform, Software Development Kit ("SDK"), or an object. The network 120 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, search engine 150, query reviser engine 170, and synonym engine 180, reordering engine 192, and optionalization engine 196 can be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device 110 includes one or more processors, computer readable media that store software applications (e.g. a browser layout engine), an input module (e.g., a keyboard or mouse), communication interface, and a display. The computing device or devices that implement the search system front-end 140, the query reviser engine 170, and the search engine 150 may include similar or different components.

In general, the search system front-end 140 receives the original search query 105 from client device 110, and routes the original search query 105 to the appropriate engines so that the search engine results page 155 may be generated. In some implementations, routing occurs by referencing static routing tables, or routing may occur based on the current network load of an engine, so as to accomplish a load balancing function. The search system front-end 140 also provides the resulting search engine results page 155 to the client device 110. In doing so, the search system front-end 140 acts as a gateway, or interface, between the client device 110 and the search engine 150. In some implementations, the search system 130 contains many thousands of computing devices to execute for the queries that are processed by the search system 130.

Two or more of the search system front-end 140, the query reviser engine 170, and the search engine 150 may be implemented on the same computing device, or on different computing devices. Because the search engine results page 155 is generated based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted search query 105.

In FIG. 1, a user of the client device 110 enters query terms 115 for the original search query 105 during state (A), and the client device 110 communicates the original search query 105 to the search system 130 over the network 120. The user may submit the original search query 105 by initiating a search dialogue on the client device 110, by speaking or typing the terms 115 of the original search query 110, then by pressing a search initiation button or control on the client device 110. The client device 110 formulates the original search query 105, e.g., by specifying search parameters, and transmits the original search query 105 over the network 120.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 may be the second or subsequent query entered by the user, or the original query 105 may be automatically derived (e.g., by the query reviser engine 170) or may be modified based upon prior queries entered by the user, location information, and the like.

During state (B), the search system front-end 140 receives the original search query 105 and communicates the original search query 105 to the query reviser engine 170. The query reviser engine 170 can generate one or more revised queries 135 based on the substance of the original search query 105. In some implementations, the query reviser engine 170 generates a revised search query 135 by reordering terms in the original search query 105. The query reviser engine 170 can obtain reordered original query terms 136 for use in revising the original search query 105 from reordering engine 192. In other implementations, the query reviser engine 170 generates a revised search query 135 by designating terms in the original search query 105 as optional. The query reviser engine 170 can obtain candidate optional terms 137 for use in revising the original search query 105 from optionalization engine 196. In other implementations, the query reviser engine 170 can generate one or more revised queries 135 using any combination of terms generated by the synonym engine 180, the reordering engine 192, and the optionalization engine 196.

During state (C), the query reviser engine 170 communicates original query terms 115 of the original search query 105 to the synonym engine 180, the reordering engine 192, and the optionalization engine 196. The synonym engine 180 optionally uses synonym rules 190 to generate synonyms 125 for the original query terms 115 of the original search query 105. The reordering engine 192 optionally uses reordering rules 194 to generate reordered original query terms 136 for the original query terms 115 of the original search query 105. The optionalization engine 196 optionally uses optionalization rules 198 to generate candidate optional terms 137 for the original query terms 115 of the original search query 105.

The search system 130 can define a reordering rule for a search query, and can use the reordering rule at a later time to identify reordered original query terms 136 for search queries. For example, for the search query "pants 34 30," the search system 130 can identify a reordering rule that indicates that "34 30 pants" and "pants 30 34" are reordered original query terms 136, and can generate a revised search query to include the reordered original query terms 136.

The search system 130 can define an optionalization rule for a search query, and can use the optionalization rule at a later time to identify candidate optional terms 137 for search queries. For example, for the search query "atlanta extreme bungee jump," the search system 130 can identify an optionalization rule that indicates "atlanta bungee jump; extreme (optional)" is an revised search query generated using the optionalization rule, and can generate a revised search query using "atlanta bungee jump; extreme (optional)."

Reordering rules can be defined to apply generally, or can be defined to apply only when particular query contexts are satisfied. The query context of a reordering rule can specify, for example, one or more other terms that must be present in the search query for the reordering rule to apply. Furthermore, query contexts can specify relative locations for the other terms (e.g. to the right or left of a query term under evaluation) or can specify a general location (e.g. anywhere in the search query). For example, a particular reordering rule can specify that numbers less than 100 should be swapped, but only when numbers less than 100 are not preceded by "pants" in the search query.

Optionalization rules can be defined to apply generally, or can be defined to apply only when particular query contexts are satisfied. The query context of an optionalization rule can specify, for example, one or more other terms that must be present in the search query for the optionalization rule to apply. Furthermore, query contexts can specify relative locations for the other terms (e.g. to the right or left of a query term under evaluation) or can specify a general location (e.g. anywhere in the search query). For example, a particular optionalization rule can specify that "extreme" should be optionalized, but only when in the context of "bungee jump."

The reordering rules can depend on query contexts that define other terms in the original query 105. In other words, a reordering rule need not apply in all situations. For example, when "555-123-4567" is used as a single-term query, the rule "swap numbers less that 1000" can apply and "123-555-4567" can be returned to the query reviser engine 170 to generate a revised search query. But when the query includes "555-123-4567" followed by "phone number," a reordering rule might not specify to swap numbers less than 1000. The reordering rules can be stored for use by, e.g., the reordering engine 192, the query reviser engine, 170, or the search engine 150.

The optionalization rules can depend of query contexts that define other terms in the original query 105. In other words, an optionalization rule need not apply in all situations. For example, when "to" is used as a single-term query, the rule "optionalize to" can apply and "to (optional)" can be returned to the query reviser engine 170 to generate a revised search query. But when the query includes "to" between "New York" and "Los Angeles," an optionalization rule might specify not to optionalize "to" when between two city names. The optionalization rules can be stored for use by, e.g., the reordering engine 192, the query reviser engine, 170, or the search engine 150.

The reordering engine 192 communicates reordered original query terms 136 to the query reviser engine 170 during state (D). The query reviser engine 170 generates one or more revised queries 135 by, for example, including the reordered original query terms 136 in a revised search query 135.

The optionalization engine 196 communicates candidate optional terms 137 to the query reviser engine 170 during state (D). The query reviser engine 170 generates one or more revised queries 135 by, for example, including the candidate optional terms 137 in a revised search query 135.

The query reviser engine 170 communicates the one or more revised queries 135 to the search system front-end 140 during state (E). The search system front-end 140 communicates the original search query 105 and/or the one or more revised queries 135 generated by the reordering rule to the search engine 150 during state (F). The search engine 150 generates search results 145 that it identifies as being responsive to the original search query 105 and/or the one or more revised queries 135 generated by the reordering rule. The search engine 150 can identify search results 145 for each search query using an index database 160 that stores indexed resources (e.g., web pages, images, or news articles on the Internet).

The search engine 150 can combine and rank the identified search results 145 and communicate the search results 145 to the search system front-end 140 during state (G). The search engine 150 may generate a score for each search result based in part on query term scoring rules that specify how occurrences of particular terms that occur in the resource identified by the search result are to be counted. An example query term scoring rule may specify that occurrences of two or more query terms that occur in the resource identified by the search result are to counted the same, regardless of whether the two or more query terms occur in the same order as they occur in the initial search query, or in a different order, e.g., a reverse order, then the order in which they occur in the initial search query. Another example query term scoring rule may specify that occurrences of two or more query terms in the different order in the resource identified by the search result are to be assigned a greater or lesser weight than occurrences of the two or more query terms in the order in which they occur in the initial search query.

The search system front-end 140 generates a search results page 155 that identifies the highest ranked search results 145. Each of the search results 145 can include, for example, titles, text snippets, images, links, reviews, or other information. The query terms 115, the reordered original query terms 136, or the candidate optional terms 137, that appear in the search results 145 can be formatted in a particular way, for example, in bold print. The search system front-end 140 transmits code (e.g., HyperText Markup Language code or eXtensible Markup Language code) for the search results page 155 to the client device 110 over the network 120 at state (H), so that the client device 110 can display the search results page 155.

The client device 110 invokes the transmitted code, e.g., using a layout engine, and displays the search results page 155 on the display 118. The terms 115 of the original query 105 are displayed in a query box (or "search box"), located for example, on the top of the search results page 155, and some of the search results 145 are displayed in a search results block, for example, on the left-hand side of the search results page 155.

Figure 2:
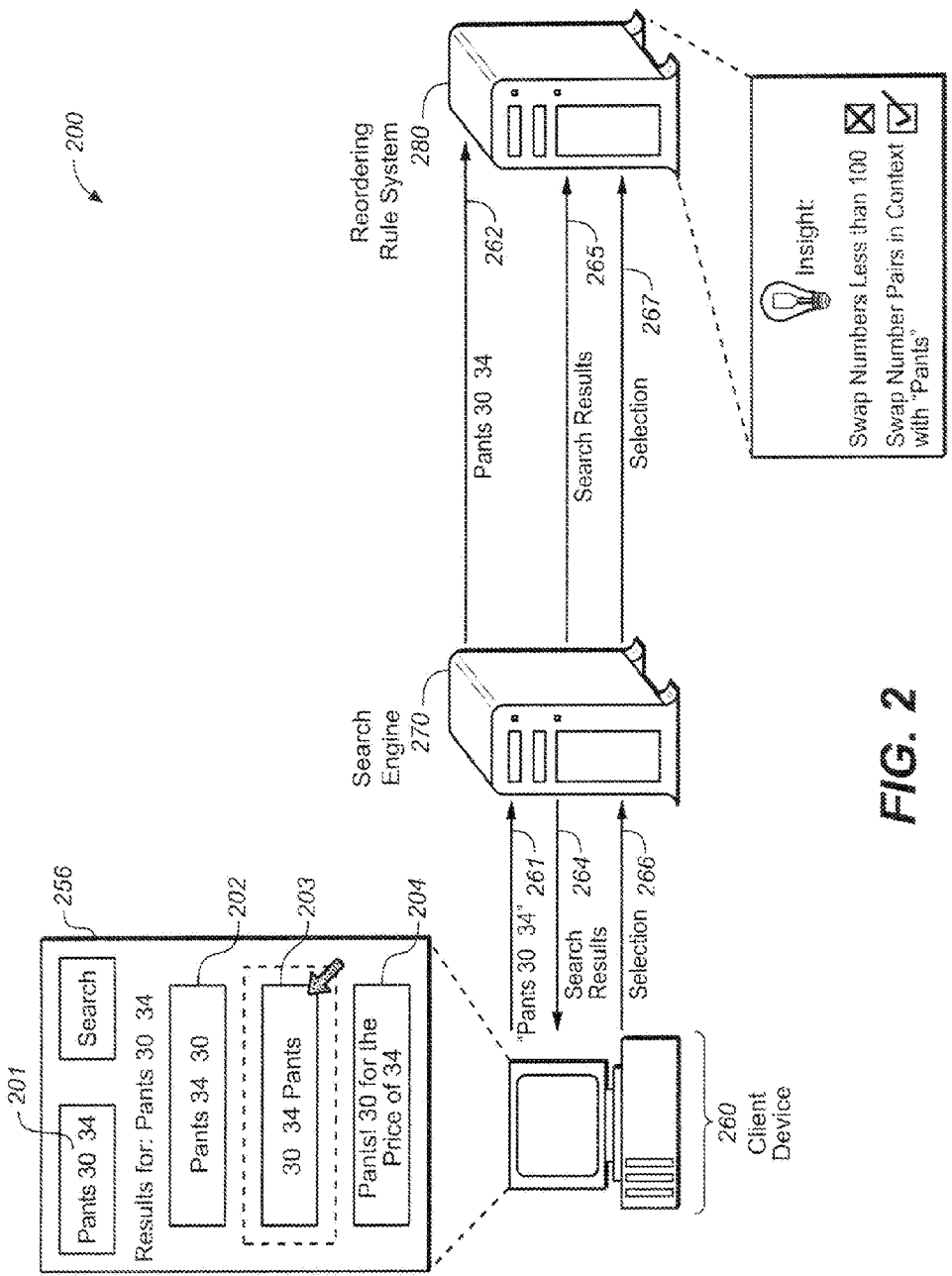
FIG. 2 is a diagram of an example system that evaluates query term reordering rules.

FIG. 2 is a diagram of an example system 200 that evaluates query term reordering rules. The system 200 includes a client device 260, a search engine system 270, and a query term reordering rule system 280. The components illustrated in FIG. 2 can, for example, be implemented as part of the system illustrated in FIG. 1. In general, the search engine system 270 receives a search query 261 from the client device 260 and provides search results 264 on a search results page 256 in response to the search query 261. In addition to the search results 264, the search results page 256 can also identify the query terms 201 of the search query 261.

Upon receiving the search query 261, the search engine system 270 can send a query message 262 that includes query terms 201 of the search query 261, as originally ordered, to the query term reordering rule system 280. The search engine system 270 can also send a search results message 265 to the query term reordering rule system 280. The search results message 265 identifies the search results 264 of the search query 261, or identifies the resources referenced by the search results 264.

The query terms 201 of the original search query 261 may occur in the resources referenced by search results 264, in the order in which the terms occur in the search query 261, i.e., "pants 30 34," or in an order which is different than the order in which the terms occur in the search query 261, i.e., "pants 34 30" or "30 34 pants." For example, the search result 202 includes the terms "pants" "and "34 30," in an order which is different than the order in which the terms occur in the search query 261. The search result 203 also includes the query terms "30 34" and "pants," in an order which is different than the order in which the terms occur in the original search query 261. The search result 204 includes the query terms "pants" "30" and "34," in a same order as the terms occur in the original search query 261.

Data that reflects user interactions with the search results 264 can be logged and analyzed in order to gain insights that the reordering rule system 280 may use to evaluate particular query term reordering rules. For example, a user selection 266 of a particular search result on search results page 256 can be received by the search engine system 270 and provided as a selection message 267 to the reordering rule system 280.

The reordering rule system 280 may in turn evaluate particular query term reordering rules that are used to revise other search queries, or to score occurrences of query terms that occur in resources identified by other search queries. For instance, using click evaluation, the reordering rule system 280 may infer that the occurrence of two or more query terms in a same order, or in a different order, as the terms occur in the original search query may have resulted in a particular search result being selected as part of a set of search results, or may have driven the user's decision to select a particular search result. Similarly, the reordering system 280 may, through skip evaluation, infer that the occurrence of two or more query terms in the same order, or in a different order, as the terms occur in the original search query may have driven the user's decision to skip a particular search result that is ranked higher than the search result that the user selected.

For example, the search engine 270 identifies search results 202, 203, and 204 in response to the search query 261, which includes the phrase "pants 30 34." If users generally tend to select search results that include the phase "30 34 pants," such as by selecting search result 203, the reordering rule system 280 can gain the insight that that the phrase "30 34 pants" is associated with high quality search results for the original query terms "pants 30 34."

Accordingly, a query term revision rule may be invoked to revise future search queries that include the phrase "pants 30 34," to reverse the order of "pants" and "30 34." Similarly, a query term scoring rule may be implemented to score occurrences of the phrase "30 34 pants" as highly as, or nearly as highly as, occurrences of the phrase "pants 30 34," in resources that are identified by the search engine 270. One such rule, for example, is a query revision rule that swaps the position of number pairs, relative to the term "pants," in future search queries.

Conversely, if users tend to skip over search results that include the phrase "pants 34 30," such as by selecting search result 202, the reordering rule system 280 can gain the insight that the phrase "pants 34 30" is associated with lower quality search results for the terms "pants 30 34." Accordingly, use of a query term revision rule that effects such a reordering can be discontinued, or a query term scoring rule may be implemented to assign a low score to occurrences of the phrase "34 30," in resources that are identified by the search engine 270 in response to a search query that includes the terms "30 34."

To evaluate reordering rules based on user interaction with provided search results, various metrics can be computed and combined into score for each reordering rule. A separate score can be computed for each reordering rule, in a general context or in particular contexts.

One metric that can be used to evaluate reordering rules is a click count. In some implementations, a "click" occurs when a user selects a search result whose referenced document does not include the reordered original query terms. In other implementations, a "click" occurs when the search result itself, and not the referenced document, does not include the reordered original query terms. Although the selection of a search result is referred to by this specification as a "click," the selection can also be a voice-based selection, or a selection by a user's finger on a presence-sensitive input mechanism, e.g., a touch-screen device, or any other appropriate selection mechanism.

When a referenced document of a selected search result contains both original search query and the revised search query containing the reordered original query terms, it may be unclear whether the original search query or the revised search query containing the reordered original query terms was responsible for selection of the search result. In these cases, the selection of the search result can be treated as a special case referred to as a "both click." In some implementations, "both clicks" may be given a weight smaller than other clicks, due to the potential ambiguity of the user selection.

Another metric that can be used to evaluate reordering rules is a skip count. A skip occurs when a user skips over a particular search result that was identified for a revised search query when the referenced document of the skipped search result does not include a reordered original query terms. Skipping over the particular search result occurs when the user selects another search result that is ranked lower than, or displayed beneath, the particular result on a search results page. In other implementations, a "skip" occurs when the search result itself, and not the referenced document, satisfies these criteria.

Figure 3A:
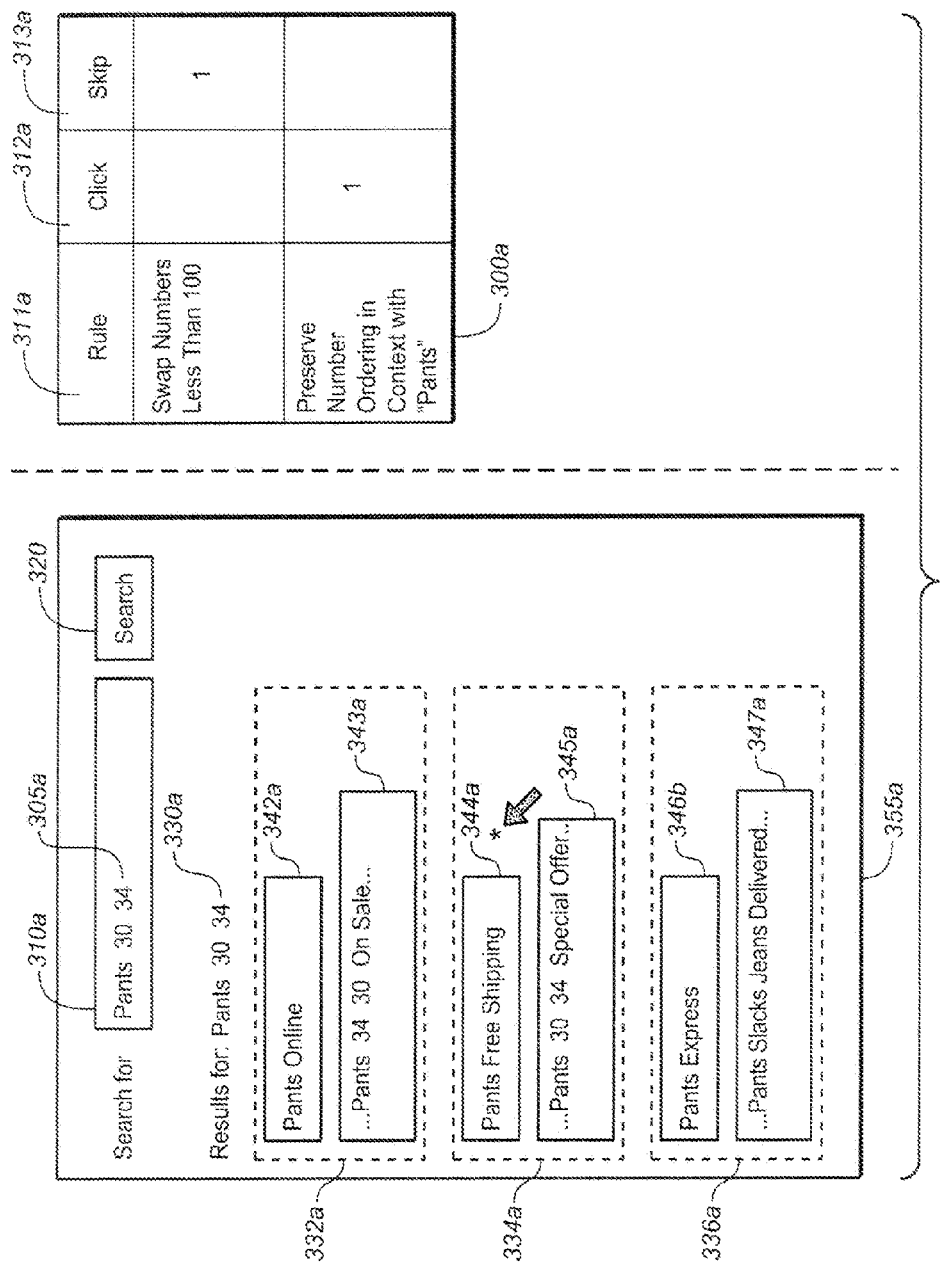

FIG. 3A illustrates and example search results page 355a and a table 300a that shows the example result of evaluating query term reordering rules using click and skip evaluation. The search results page 355a presents a ranked list of search results in response to a search query 305a ("pants 30 34") entered into a search box 310a. The search results page can include a control element 320 (e.g. a button) for initiating a search. Each search result 332a, 334a, and 336a includes a title (e.g. "Pants Online" 342a) and a snippet (e.g. " . . . pants 30 34 on sale . . . " 343a).

A user's selection of a particular search result can be evaluated using click or skip evaluation, resulting in a click or skip being counted for particular reordering rules associated with the particular search result. The search results page 355a can be provided by a search system, for example, search system 130 as shown in FIG. 1. In addition, a search system (for example, search system 130) can receive user selections of search results on the search results page 355a and evaluate query term reordering rules based on the user selections.

In the example illustrated, for the three term search query "pants 30 34," a reordering rule system may evaluate the query term reordering rules "swap numbers less than 100" and "preserve number ordering if after pants." The table 300a shows query term reordering rules 311a that are under evaluation for revising future search queries. The resulting click count 312a and skip count 313a are also illustrated in table 300a. In the example shown in FIG. 3A, only the reordering rules "swap numbers less than 100" and "preserve number ordering if after pants" are illustrated, although query term reordering rules other than those shown in table 300a may also be evaluated.

In this example, search result 334a has been selected by a user. For the particular reordering rule "preserve number ordering in context with the term 'pants,'" search result 334a has the same number ordering as the search query 305a "pants 30 34," and the numbers are followed by pants. Therefore, the selection of search result 334a is counted as a click for the query term reordering rule "preserve number ordering in context with 'pants'" and recorded, illustrated under click count 312a in table 300a.

In addition, search result 332a has not been selected by a user. For the particular query term reordering rule "swap numbers less than 100," search result 332a has the numbers swapped compared to the search query 305a "pants 30 34," and the numbers 30 and 34 are less than 100. In the search results page 355a, the search result 332a was ranked above the search result 334a because the search result 332a was listed higher than the search result 334a on the search results page 355a. Therefore, because the user selected the search result 334a and skipped the search result 332a, the query term reordering rule "swap numbers less than 100" is incremented as illustrated under skip count 313a in table 300a.

FIG. 3B illustrates an example search results page 355b and a table 300b that show the example result of evaluating reordering rules using click and skip evaluation. The example search results page 355b is similar to the search results page as shown in FIG. 3A. However, in this example, reordering rules "swap numbers less than 1000" and "preserve numbers separated by dashes" are applied to the search query 305b "555-123-4567."

In this example, search result 334b has been selected by a user. For the particular query term reordering rule "preserve numbers separated by dashes," the selected search result 334b has the same number ordering as the search query 305b "555-123-4567," and the numbers are separated by dashes. Therefore, the selection of search result 334b is counted as a click for the query term reordering rule "preserve numbers separated by dashes" and recorded, illustrated under click count 312b in table 300b.

In addition, search result 332b has not been selected by a user. For the particular query term reordering rule "swap numbers less than 1000," search result 332b has the numbers swapped compared to the search query 305b "555-123-4567," and the numbers 555 and 123 are less than 100. In the search results page 355b, the search result 332b was ranked above the search result 334b because the search result 332b was listed higher than the search result 334b on the search results page 355b. Therefore, since the user selected the search result 334b and skipped the search result 332b, the reordering rule "swap numbers less than 1000" is incremented as illustrated under skip count 313b in table 300b.

A reordering system can aggregate counts of clicks and skips into a single score to evaluate a particular reordering rule. In some implementations, the reordering system can remove a reordering rule whose corresponding score is below a threshold.

For example, the reordering system can assign a respective weight (e.g. 3 and 5) to a click count and a skip count. In some implementations, the weights are empirically determined. The reordering system can then compute a weighted ratio using a combination of counts recorded for a particular reordering rule as shown below in Equation (2), using example weights A and B:

$$\frac{A(\text{click count})}{A(\text{click count}) + B(\text{skip count})} \qquad (2)$$

If the score is below a threshold (e.g. 0.6, 0.75, 0.9, 0.99), the reordering system can remove or demote a particular reordering rule. After removing the reordering rule from the system, revised queries generated by the search system 130 will not include reordered original query terms identified with the particular reordering rule.

Figure 4:
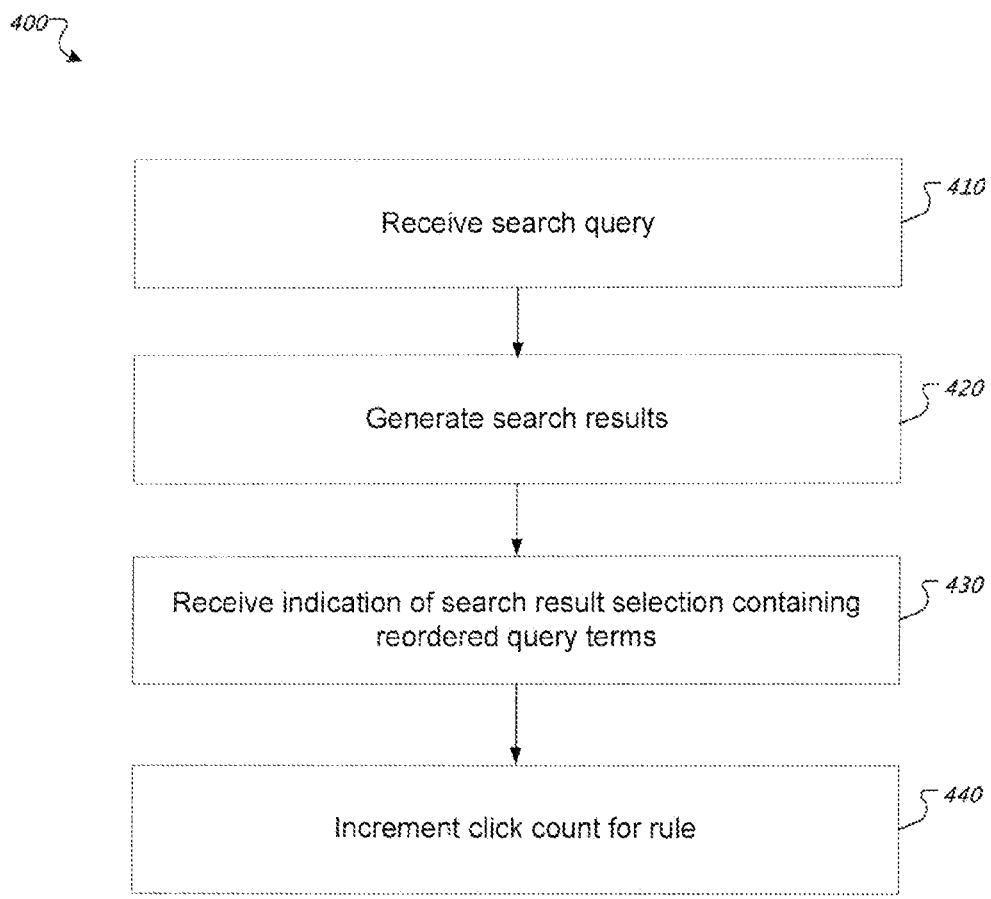
FIGS. 4 and 5 are flow charts of example processes for evaluating query term reordering rules using click and skip evaluation.

FIG. 4 is a flow chart of an example process 400 for evaluating reordering rules using click and skip evaluation. In general, the process 400 analyzes user interaction with a provided set of search results that were identified using revised queries generated using a particular reordering rule. The process 400 will be described as being performed by a computer system comprising one or more computers, for example, the search system 130 as shown in FIG. 1.

The system receives and initial search query including two or more query terms (410). For each search query, the system can identify reordering rules to be used for retrieving search results.

The system generates search results using the initial search query (420). The system can use the retrieved search results to generate a search results page that is forwarded for display by a client device.

The system receives an indication that the user has selected a particular search result (430). The system determines that the particular search result includes the two or more query terms in a different order than the particular order in which the two or more query terms are ordered in the initial search query. In some implementations, instead of analyzing only the provided search result, the system analyzes the entire indexed document for the presence or absence of the reordered original query terms and the original query terms.

The system increments a click count for the reordering rule that corresponds a query term reordering rule associated with the two or more query terms (440). The system can combine one or multiple click and skip counts into a single score for the reordering rule. Each count can have an associated weight. For example, the system can weight the click count five times more significant than the skip count.

In some implementations, the system computes a score based on a ratio of click counts to skip counts. The system can then use the score to adjust a confidence score for the particular reordering rule. The system can also remove a reordering rule whose score did not exceed a threshold. In other words, subsequently generated revised queries will not include reordered query terms according to the removed reordering rule.

In some implementations, the system can compute click counts and skip counts for a particular reordering rule offline by processing data stored in a query log. Query logs store anonymized data regarding provided search results for a certain period of time (e.g. a week). Query log data can include, for example, an initial search query, reordered original query terms, one or more revised search queries generated by a reordering rule, the search results retrieved by the initial search query and one or more revised search queries generated by a reordering rule, and one or more search results that were selected by a user.

By using query log data, the system can compute confidence scores using click counts and skip counts offline instead of waiting for real-time interaction with provided search results. The system can process query log data periodically to compute scores for reordering rules and remove or adjust confidence scores of reordering rules as needed.

Figure 5:
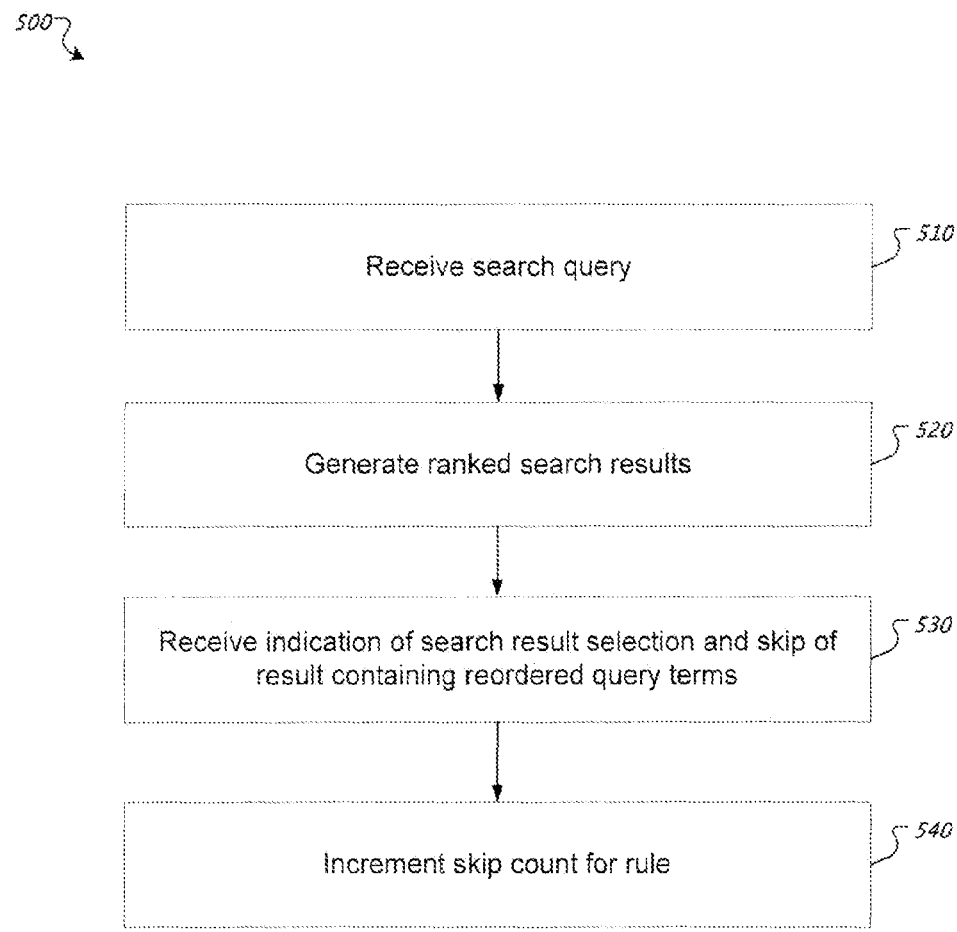

FIG. 5 is a flow chart of an example process 500 for evaluating reordering rules using click and skips. In general, the process 500 analyzes user interaction with a provided set of search results that were identified using revised queries generated using a particular reordering rule. The process 500 will be described as being performed by a computer system comprising one or more computers, for example, the search system 130 as shown in FIG. 1.

The system receives an initial search query including a query term (510). Search queries can contain two or more terms. For each query term, the system can identify reordering rules for each query term to be used for retrieving search results.

The system generates ranked search results using the initial search query (520). The system can use the retrieved search results to generate a search results page that is forwarded for display by a client device. The system ranks the search results and lists them in descending order, the highest ranked search result being at the top of the search results page.

The system receives an indication that the user has selected a particular search result (530). The system determines that a search result that is ranked above the particular search result includes the two or more query terms in a different order than the particular order in which the two or more query terms are ordered in the initial search query. In some implementations, instead of analyzing only the provided search result, the system analyzes the entire indexed document for the presence or absence of the reordered original query terms and the original query terms.

The system increments a skip count for the reordering rule that corresponds a query term reordering rule associated with the two or more query terms (540). The system can combine one or multiple click and skip counts into a single score for the reordering rule. Each count can have an associated weight. For example, the system can weight the click count five times more significant than the skip count.

In some implementations, the system computes a score based on a ratio of click counts to skip counts. The system can then use the score to adjust a confidence score for the particular reordering rule. The system can also remove a reordering rule whose score did not exceed a threshold. In other words, subsequently generated revised queries will not include the reordered original query terms according to the removed reordering rule.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   accessing query log data that identifies, for an initial search query that includes a sequence of query terms:
   two or more particular query terms that are included in a particular order in the sequence of query terms of the initial search query,
   search results that were generated using the initial search query, and
   a particular search result selected by the user;
   determining, using the query log data, that the particular search result includes the two or more particular query terms in a different order than the particular order in which the two or more particular query terms are ordered in the sequence of query terms of the initial search query;
   in response to determining that the particular search result includes the two or more particular query terms in the different order, adjusting a click count for a query term reordering rule associated with the two or more particular query terms; and
   determining, based at least on the adjusted click count, whether to revise a search query using the query term reordering rule.

2. The method of claim 1, wherein adjusting the click count for the query term reordering rule comprises incrementing the click count for the query term reordering rule, and wherein the method comprises assigning a score to the query term reordering rule based on the click count and a skip count.

3. The method of claim 2, wherein the score assigned to the query term reordering rule is based on a ratio of (i) the click count to (ii) the click count and the skip count.

4. The method of claim 2, comprising:
   determining that the score assigned to the query term reordering rule does not meet a threshold; and
   removing the query term reordering rule from a set of query term reordering rules used to generate revised search queries, based on determining that the score assigned to the query term reordering rule does not meet the threshold.

5. The method of claim 2, comprising associating a first weight with the click count and a second weight with the skip count.

6. The method of claim 5, wherein the score assigned to the query term reordering rule satisfies:

$$\frac{W1(\text{click count})}{W1(\text{click count}) + W2(\text{skip count})}$$

wherein W1 represents the first weight associated with the click count and W2 represents the second weight associated with the skip count.

7. The method of claim 1, wherein the query term reordering rule comprises a query term revision rule for revising search queries by reordering the two or more particular query terms from the particular order in which the two or more particular query terms are ordered in the sequence of query terms of the initial search query to the different order.

8. The method of claim 1, wherein the query term reordering rule comprises a query term scoring rule for scoring occurrences of the two or more particular query terms that occur in the different order in search results that were generated using search queries.

9. The method of claim 1, wherein the different order is a reverse of the particular order in which the two or more particular query terms are ordered in the sequence of query terms of the initial search query.

10. A computer-implemented method comprising:
    accessing query log data that identifies, for an initial search query that includes a sequence of query terms:
    two or more particular query terms that are included in a particular order in the sequence of query terms of the initial search query,
    search results that were generated using the initial search query,
    a ranking of the search results, and
    a particular search result selected by the user;
    determining, using the query log data, that a search result that is ranked above the particular search result includes the two or more particular query terms in a different order than the particular order in which the two or more particular query terms are ordered in the sequence of query terms of the initial search query;
    in response to determining that the search result that is ranked above the particular search result includes the two or more particular query terms in the different order, adjusting a skip count for a query term reordering rule associated with the two or more particular query terms; and
    determining, based at least on the adjusted click count, whether to revise a search query using the query term reordering rule.

11. The method of claim 10, wherein adjusting the skip count for the query term reordering rule comprises incrementing the skip count for the query term reordering rule, and wherein the method comprises assigning a score to the query term reordering rule based on a click count and the skip count.

12. The method of claim 11, wherein the score assigned to the query term reordering rule is based on a ratio of (i) the click count to (ii) the click count and the skip count.

13. The method of claim 11, comprising:
    determining that the score assigned to the query term reordering rule does not meet a threshold; and
    removing the query term reordering rule from a set of query term reordering rules used to generate revised search queries, based on determining that the score assigned to the query term reordering rule does not meet the threshold.

14. The method of claim 11, comprising associating a first weight with the click count and a second weight with the skip count.

15. The method of claim 14, wherein the score assigned to the query term reordering rule satisfies:

$$\frac{W1(\text{click count})}{W1(\text{click count}) + W2(\text{skip count})}$$

wherein W1 represents the first weight associated with the click count and W2 represents the second weight associated with the skip count.

16. The method of claim 10, wherein the query term reordering rule comprises a query term revision rule for revising search queries by reordering the two or more particular query terms from the particular order in which the two or more particular query terms are ordered in the sequence of query terms of the initial search query to the different order.

17. The method of claim 10, wherein the query term reordering rule comprises a query term scoring rule for scoring occurrences of the two or more particular query terms that occur in the different order in search results that were generated using search queries.

18. The method of claim 10, wherein the different order is a reverse of the particular order in which the two or more particular query terms are ordered in the sequence of query terms of the initial search query.

19. A system comprising:
one or more computers and one or more storage devices storing instructions that are operable, when executed by the one or more computers, to cause the one or more computers to perform operations comprising:
accessing query log data that identifies, for an initial search query that includes a sequence of query terms:
two or more particular query terms that are included in a particular order in the sequence of query terms of the initial search query,
search results that were generated using the initial search query, and
a particular search result selected by the user;
determining, using the query log data, that the particular search result includes the two or more particular query terms in a different order than the particular order in which the two or more particular query terms are ordered in the sequence of query terms of the initial search query;
in response to determining that the particular search result includes the two or more particular query terms in the different order, adjusting a click count for a query term reordering rule associated with the two or more particular query terms; and
determining, based at least on the adjusted click count, whether to revise a search query using the query term reordering rule.

20. The system of claim 19, wherein adjusting the click count for the query term reordering rule comprises incrementing the click count for the query term reordering rule, and wherein the operations comprise assigning a score to the query term reordering rule based on the click count and a skip count.

21. The system of claim 20, wherein the score assigned to the query term reordering rule is based on a ratio of (i) the click count to (ii) the click count and the skip count.

22. The system of claim 20, the operations comprising:
determining that the score assigned to the query term reordering rule does not meet a threshold; and
removing the query term reordering rule from a set of query term reordering rules used to generate revised search queries, based on determining that the score assigned to the query term reordering rule does not meet the threshold.

23. The system of claim 20, comprising associating a first weight with the click count and a second weight with the skip count.

24. The system of claim 19, wherein the query term reordering rule comprises a query term revision rule for revising search queries by reordering the two or more particular query terms from the particular order in which the two or more particular query terms are ordered in the sequence of query terms of the initial search query to the different order.

25. The system of claim 19, wherein the query term reordering rule comprises a query term scoring rule for scoring occurrences of the two or more particular query terms that occur in the different order in search results that were generated using search queries.

* * * * *